United States Patent
Brizio (10) Patent No.: US 6,912,949 B2
(45) Date of Patent: Jul. 5, 2005

(54) COFFEE MAKER (76) Inventor: Adriana Brizio, Via Sempione 46, Baveno VB (IT), I-28831

( * ) Notice: Subject to any disclaimer, the term of this patent is extended or adjusted under 35 U.S.C. 154(b) by 0 days.

(21) Appl. No.: 10/398,246

(22) PCT Filed: Sep. 21, 2001

(86) PCT No.: PCT/EP01/10947
§ 371 (c)(1),
(2), (4) Date: Apr. 3, 2003

(87) PCT Pub. No.: WO02/28242

PCT Pub. Date: Apr. 11, 2002

(65) Prior Publication Data
US 2004/0094039 A1 May 20, 2004

(30) Foreign Application Priority Data

Oct. 4, 2000 (IT) ..................................... MI2000A2145

(51) Int. Cl.⁷ ............................. A47J 31/00; A47J 31/04
(52) U.S. Cl. ........................................... 99/303; 99/295
(58) Field of Search ........................... 99/303, 292, 295

(56) References Cited

U.S. PATENT DOCUMENTS

| | | | | |
|---|---|---|---|---|
| 690,310 A | * | 12/1901 | McBride | ...................... 99/285 |
| 865,776 A | * | 9/1907 | Georg | ......................... 99/303 |
| 2,464,722 A | * | 3/1949 | Sacker | ......................... 99/292 |
| 2,570,997 A | * | 10/1951 | Willman | ....................... 99/303 |
| 5,902,620 A | * | 5/1999 | Nolan | ......................... 426/241 |
| 6,026,733 A | | 2/2000 | Orrico et al. | |

FOREIGN PATENT DOCUMENTS

| | | |
|---|---|---|
| EP | 0 838 186 A | 4/1998 |
| GB | 976 601 A | 12/1964 |
| NL | 1 009 143 | 11/1999 |

* cited by examiner

Primary Examiner—Reginald L. Alexander
(74) Attorney, Agent, or Firm—Young & Thompson (57) ABSTRACT The coffee maker comprises a chamber acting as a boiler to receive a determined quantity of water; a chamber for the final collection of the beverage produced; and, for containing the ground coffee, a filter device connecting together the two chambers and comprising a tube which dips into the water contained in the boiler. A baffle is provided to sealedly close the boiler, with the exception of a through hole for sealedly receiving the filter device. The filter device comprises an enclosure closed or closable to form a filter capsule intended to contain the ground coffee and closed or closable independently of whether the coffee maker is assembled. The walls of the capsule are liquid-permeable in a region which communicates with the tube and in at least one other region which communicates with the collection chamber.

17 Claims, 6 Drawing Sheets

COFFEE MAKER

BACKGROUND OF THE INVENTION

A type of coffee maker for domestic use commonly known as "espresso coffee maker" has been widely available for a considerable time, it comprising two chambers to be connected together, a first chamber acting as the boiler to receive a determined quantity of water, and a second chamber acting as a collector for the beverage produced. The boiler is upperly open to receive a funnel-shaped accessory, the lower end of which dips into the water contained in the boiler, this accessory comprising a perforated intermediate baffle onto which a suitable quantity of ground coffee is loaded. As is well known, the perforations of said perforated baffle are of a size such as to prevent the ground coffee passing through them.

When the coffee maker is assembled, the funnel-shaped accessory is closed upperly by a second perforated baffle removably applied to the bottom of the collection chamber. This latter is bounded at its base by an upwardly tapered vertical channel (in the manner of an inverted funnel), which lies above the second perforated baffle, the upper end of this tapered channel presenting one or more apertures at a level higher than the level of the produced beverage which is to be collected in the collection chamber.

The device formed from said funnel-shaped accessory and said tapered vertical channel, including the two relative perforated baffles, will be known herein as the filter device.

As is well known, if the aforedescribed coffee maker is placed on a heat source, after a certain time the water contained in the boiler will boil and pass, in accordance with a known physical principle, through the filter device and consequently through the ground coffee contained therein (the ground coffee transferring its contained soluble substances to the water), to then pour from the upper aperture or apertures of the tapered channel in the form of a coffee extract beverage (commonly and simply known as coffee, but known herein as "beverage" for greater clarity) which is finally collected in the collection chamber.

As is well known, a suitable annular gasket outwardly seals the joint between the two said chambers when the coffee maker has been assembled, the gasket also retaining the second perforated baffle in position.

The aforedescribed known coffee maker presents however numerous drawbacks, a first of which is the manufacturing cost of the coffee maker and in particular of said filter device.

If the coffee maker is constructed of aluminium (as in its most common version), the construction of the filter device, and in particular that part of it forming said tapered channel, involves the use of complicated and costly casting moulds. Manufacturing costs are even higher if the coffee maker is constructed of stainless steel, because of the known difficulty of welding those parts of that material.

Another drawback derives from the coffee maker structure itself, which renders it somewhat impractical for the user. In this respect, to feed water into the boiler or the ground coffee into the filter device, the two chambers have to be separated and the said funnel-shaped accessory removed from the boiler. In addition, when filling the upper part of the funnel-shaped accessory, the ground coffee can easily fall out (with consequent wastage). Again, ground coffee can remain along the upper edge of the boiler, and hence come into contact with the outward seal gasket at the joint between the two chambers, with the result that on closing the coffee maker the seal provided by this gasket may not be perfect.

In addition, to remove the already spent ground coffee from the filter device, the collection chamber has firstly to be separated from the boiler and then the funnel-shaped accessory be extracted from this latter, an operation which is certainly not easy; it is also not easy to completely eliminate the spent ground coffee from the funnel-shaped accessory or the spent coffee residues from the second baffle applied to the collection chamber.

It is also common experience that to separate the funnel-shaped accessory from the boiler and completely remove the spent ground coffee from it, the hands inevitably become soiled and some spent coffee residues may spread around. Finally, everyone is aware that, with the passage of time, there forms inside such a coffee maker, in particular inside its collection chamber and inside the relative tapered channel, a brown coating which in the long term can give rise to actual incrustations. This coating is not easy to remove, particularly from the collection chamber or the tapered channel, because of their shape.

SUMMARY OF THE INVENTION

An object of the present invention is to provide a coffee maker which is simpler and less costly to construct than the aforedescribed known coffee maker.

Another object of the invention is to provide a coffee maker of the aforesaid type which is more simple and practical to use (and hence also to clean) than the aforesaid known coffee maker.

The first aforestated object is attained by the coffee maker of the present invention, comprising:
  a chamber acting as a boiler to receive a determined quantity of water;
  a chamber for the final collection of the beverage produced;
  for containing the ground coffee, a filter device connecting together the two chambers and comprising a tube which dips into the water contained in the boiler;
characterised in that:
  a baffle is provided to sealedly close the boiler, with the exception of a through hole for sealedly receiving the filter device;
  the filter device comprises an enclosure closed or closable to form a filter capsule intended to contain the ground coffee and closed or closable independently of whether the coffee maker is assembled, the walls of the capsule being liquid-permeable in a region which communicates with the tube and in at least one other region which communicates with the collection chamber.

The first aforestated object is attained by the coffee maker the essential characteristics of which have just been described, this coffee maker not presenting the tapered channel, the funnel-shaped accessory and the two relative perforated baffles of the aforesaid known coffee makers, hence substantially simplifying the coffee maker structure.

Advantageously just the dip tube of the filter device need be inserted through the hole in the baffle, so that normally the filter capsule lies above the baffle, within the collection chamber of the coffee maker. It is important however to note that this does not mean that the capsule cannot be directly inserted into the hole in the baffle (obviously by providing a hole of adequate size). It is also important to note that the capsule can also be positioned below the baffle, in which case the filter device must also comprise a supplementary upper tube to be inserted through the hole in the baffle and connect the entire capsule to the collection chamber.

Another considerable simplification enabled by the coffee maker of the present invention is a consequence of the possible marketing of the filter capsule already containing ground coffee, in which case it does not have to be opened by the user to remove the spent ground coffee and new ground coffee added. In such a case at least the filter capsule of the filter device, but in the limit (as will be seen) the entire filter device—possibly including the baffle, which must be removable—can be of the disposable type, to hence attain the second aforestated object.

As will be apparent such a solution is extremely practical and does not result in soiling of the hands or the environment, in the sense that, having purchased the disposable filter device or that part of it which is disposable (in the limit just the filter capsule), it has merely to be located in position after feeding the relative quantity of water into the coffee maker boiler, and then the coffee maker placed on a heat source, to finally obtain the required beverage. On completion, the disposable part is simply removed.

Even if the filter device is not of the disposable type it can be handled, refilled or emptied and washed very simply.

The said baffle can be constructed in one piece with the first or second chamber of the coffee maker, or be removable, in which case it must be provided with relative means which, when the coffee maker is assembled, form a seal along its periphery. Alternatively the removable baffle can form one piece with the filter device, or with the tube alone. In the second case the filter capsule must be separable from the tube.

The ground coffee to be used can also be prepacked in the form of measured quantities previously enclosed in liquid-permeable containment enclosures (such as filter paper, mesh or cloth sachets) to be inserted into the filter capsule by the user or, if the filter capsule is disposable, directly by the coffee maker supplier.

The filter device can be of a suitable metal (for example of aluminium or stainless steel) or of a plastic material able to withstand the relative temperatures and suitable for contact with food. If the filter device is formed of several separable parts, or at least separately constructed parts, it can be composed of different materials.

The filter capsule can be of the most varied shapes. It can for example be parallelepiped, spherical, cylindrical, or even egg or heart shaped, or still more complex in shape, the limit being set only by feasibility and fantasy.

The filter capsule can be formed of two or more parts connectable together. This connection can be permanent in the case of a disposable filter capsule (in which case the connection is made by the ground coffee provider); alternatively the connection can be of the type which enables at least one of the component parts of the filter capsule to be removed, in which case this latter is reusable by the user. In this case the user has to remove the spent ground coffee present in it to refill it with new ground coffee. In the first case the component parts of the capsule (conveniently not more than two) can be glued or bonded together (if of plastic, by using for example known ultrasonic bonding), whereas in the second case a forced-insertion, screw, bayonet or snap-clip connection can be used. The capsule can also be in one piece, for example constructed of extruded plastic.

Liquid permeability of the filter capsule can be achieved by providing in the corresponding regions thereof simple perforations of size such as to prevent the grains of ground coffee escaping through them. Another solution is to use a metal or nylon mesh to form the capsule or its parts. A further solution is to provide in the capsule corresponding larger dimension apertures (for example even a single aperture communicating with the tube and a single aperture communicating with the interior of the collection chamber), over which apertures a liquid permeable means (for example filter paper, a mesh or a suitable filter cloth) is provided to prevent escape of the ground coffee grains. Again, and as already stated hereinbefore, if the ground coffee is provided already enclosed in a liquid permeable enclosure to be inserted into the filter capsule, this latter can have its apertures not provided with said liquid permeable means. In the limit the apertures provided in the capsule are of such size as to cause this latter to assume the appearance of a cage.

The tube of the filter device is preferably straight and positioned vertically. There is however nothing to prevent it being other than straight.

According to another variant of the present invention the filter device (tube plus capsule) and the relative baffle, made obviously removable, form one piece which can be supplied with the ground coffee already inserted into the relative sealed filter capsule (this then being disposed of after use).

According to a further variant of the invention, the removable baffle, the tube and the lower part of the filter capsule form one piece, whereas the other part of the capsule is made removable or tiltable to enable the ground coffee to be inserted into the filter capsule each time it is used.

According to still another variant, only the tube of the filter device and the removable baffle form one piece, the filter capsule being applied to the baffle such that its interior communicates with the tube.

BRIEF DESCRIPTION OF THE DRAWINGS

The invention will be more apparent from the following description of some embodiments thereof. In this description, reference is made to the accompanying drawings, in which.

DETAILED DESCRIPTION OF THE PREFERRED EMBODIMENTS

Figure 1:
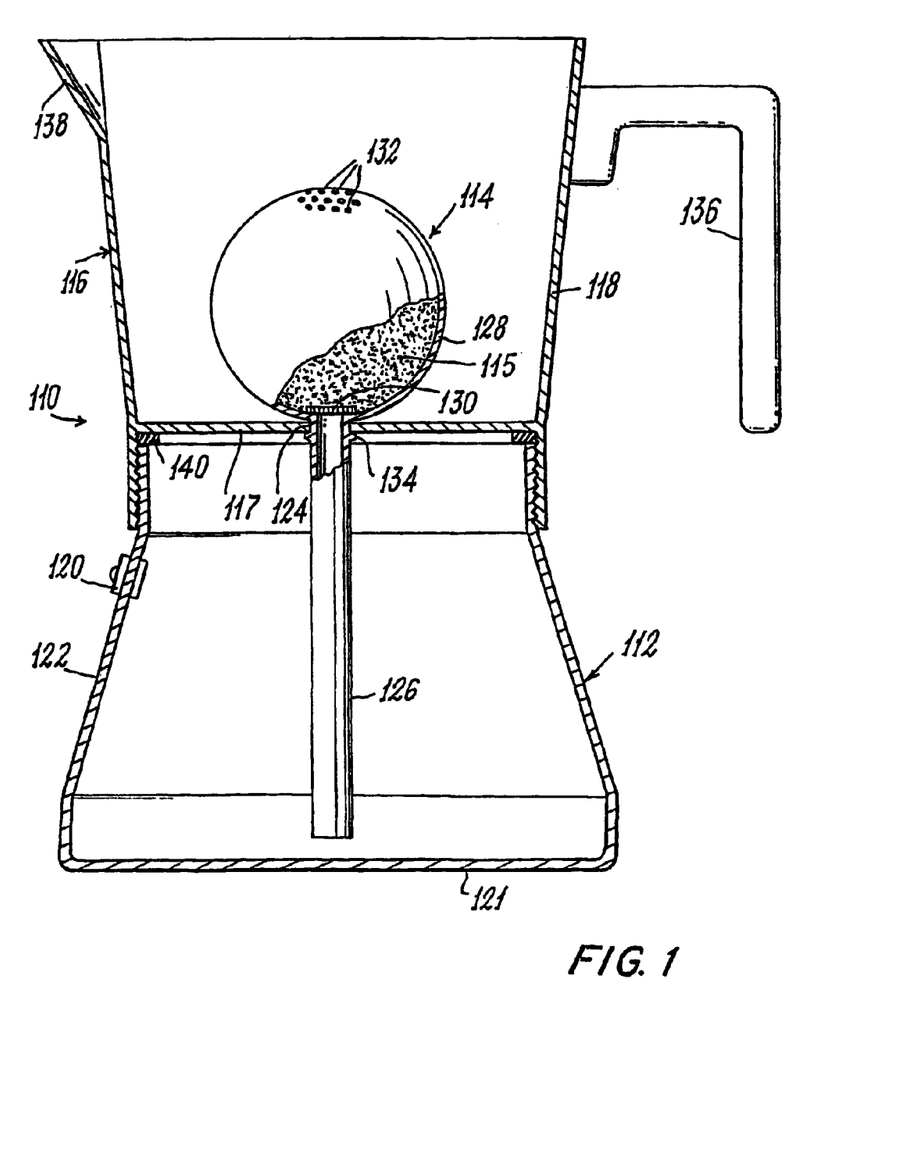
FIG. 1 is a schematic vertical section through a first embodiment of a coffee maker according to the present invention.

As can be seen from FIG. 1, the coffee maker 110 comprises a first chamber or boiler 112 to contain a determined quantity of water (not shown for simplicity), and a second chamber 116 for finally collecting the formed beverage. The coffee maker 110 also comprises a filter device 114 formed in this specific case in one piece from a plastic material suitable for contact with food and able to withstand the relative temperatures. The piece 114 consists of a capsule 128 (in the illustrated example being spherical and shown partly cut-away) which when the coffee maker has been assembled lies within the collection chamber 116, and a tube 126 the upper end of which is in this specific case rigid with the capsule 128 whereas its other end dips into the water contained in the boiler 112. The capsule 128 is intended to contain a determined quantity of ground coffee 115. There is also provided a baffle 117 which in this specific case forms one piece with the collection chamber 116 and presents in its centre a through hole 124 through which (as can be seen in FIG. 1) the tube 126 of the filter device 114 can be inserted. The tube 126 presents an annular outer lip 134 (or more than one lip) which (as the piece 114 is of plastic) provides a sufficient seal between the tube 126 and baffle 117.

A conventional safety valve 120 is provided in the boiler 112 (which is substantially similar to the boiler of a conventional "espresso" coffee maker. The boiler 112, which comes directly into contact with the heat source, is basically in the form of a single piece of metal (normally aluminium or stainless steel), is upperly open and consists of a base 121 and a side wall 122 presenting at its top an outer thread which enables it to be connected to the collection chamber 116. For this purpose this latter presents a similar inner thread on its bottom. An annular gasket 140 provides the outward seal when the coffee maker 110 is assembled.

It should be noted that instead of a threaded connection between the collection chamber and the boiler, another type of connection, for example a bayonet connection, can be used provided it ensures a seal.

The collection chamber 116 can conveniently be of metal (usually of the same metal as the boiler 112), but can also be formed of a different material, for example of porcelain or heat resistant glass. In the illustrated example, it incorporates the baffle 117 which forms its base, integral with the side wall 118. In the illustrated example the capsule 128 is spherical. To prevent the ground coffee 115 contained in the capsule 128 from falling into the tube 126, the upper end of this latter is closed by a liquid-permeable baffle 130. The baffle can for example consist of a piece of filter paper, of fabric, a perforated plate or a mesh, all of a material suitable for contact with food and able to withstand the relative temperatures.

As can be seen from FIG. 1, at its top the capsule 128 presents perforations 132 which in this specific case are of size such as not to allow the ground coffee to escape from them. To prevent the formed beverage collected in the collection chamber 116 of the coffee maker 110 from returning to the boiler 112, the perforations 132 must be located higher than the level reached by the beverage in the collection chamber 116.

As stated, the capsule 128 and the tube 126 form one piece 114 which can be sold with the ground coffee already inserted into the capsule 128. The piece 114 is hence intended to be used only once, to be then thrown away. This piece can also be formed of a suitable plastic in two parts (for example by injection moulding), namely a first part comprising the tube 126 and the lower half of the spherical capsule 128, and a second part consisting of the upper half of the capsule 128. After applying the permeable element 130 in conventional manner (depending on its constituent material) to the interior of the lower half of the capsule 128, at the position in which the tube 126 opens thereinto, the upper half of the capsule 128 is fixed (for example by ultrasonic bonding) to its lower half having firstly fed the desired quantity of ground coffee into the lower half of the capsule 128.

The piece 114 can also be obtained in other ways, for example by separately forming the tube 126 and the capsule 128, then applying the liquid-permeable element 130 in conventional manner (depending on its constituent material) to the corresponding end of the tube 126 and then fixing this end (also in conventional manner) to the capsule 128 at its lower hole, after feeding the ground coffee 115 therethrough.

To arrange the piece 114 in the position of FIG. 1, the tube 126 is merely inserted into the piece 114 through the through hole 124 present in the baffle 117, and the top of the capsule 128 is pressed downwards with the hands to cause the lip 134 to snap beyond the baffle 117. A stop means (not shown) is also conveniently provided to prevent the tube being pushed too far into the hole 124.

If the piece 114 is not of the disposable type, it can be formed as in the aforedescribed first version, but of a more costly material such as stainless steel or aluminium, the two parts which form the capsule 128 being connected together for example by screwing or by a bayonet connection. In this case, each time a beverage is to be obtained, the capsule 128 has to be opened, any spent ground coffee present therein eliminated, the desired quantity of ground coffee poured into the lower half of the capsule 128, and finally the capsule 128 closed by applying its upper half.

As can be seen from FIG. 1, the collection chamber 116 of the coffee maker 110 presents a conventional handgrip 136 and a conventional spout 138. In the figure the collection chamber 116 is shown without a lid for simplicity. However the coffee maker can evidently be provided with a lid, in particular a conventional hinged lid.

The use of the coffee maker 110 is totally apparent (especially in the light of the aforegoing), its description therefore being considered superfluous.

Figure 2:
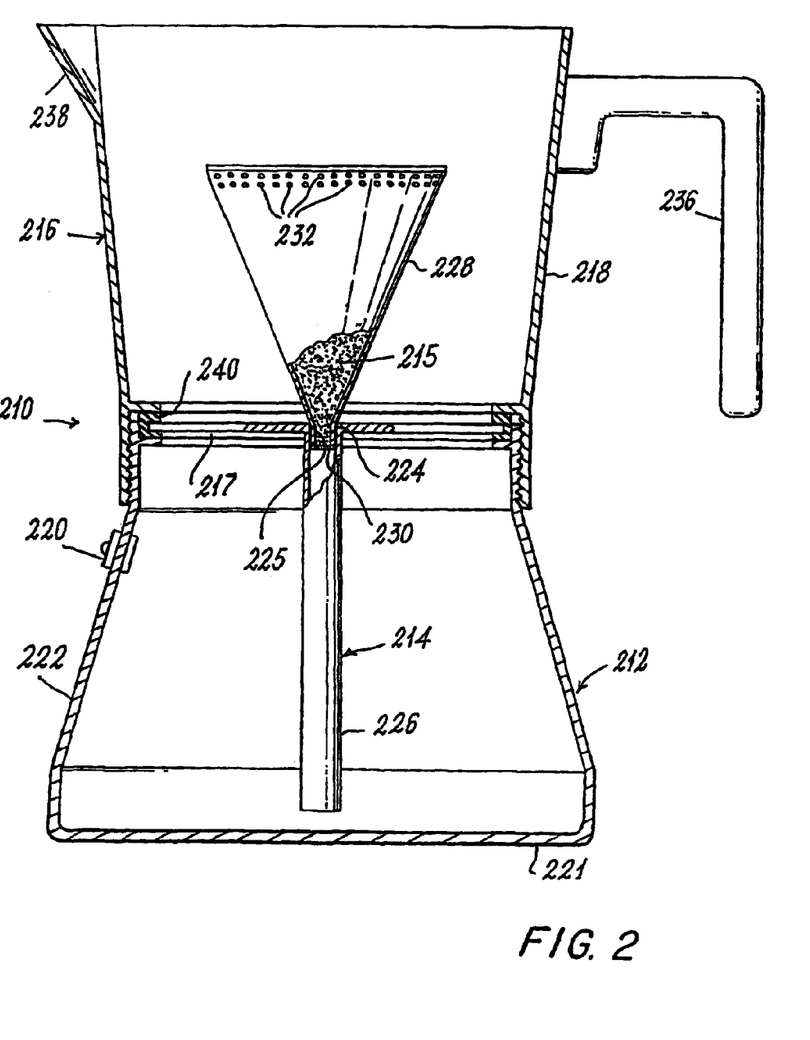
FIG. 2 is a second embodiment thereof.

In the coffee maker 210 illustrated in FIG. 2 (in which equal elements or those of similar function are indicated by the same reference numerals as FIG. 1 plus 100) the differences between this and the coffee maker of FIG. 1 are basically the fact that in this case the tube 226 forms one piece (indicated by 214) with the baffle 217, the baffle not being (in contrast to the preceding embodiment 110) rigid with the side wall 218 of the collection chamber 216, but still acting as an upper closure for the boiler 212 when the coffee maker 210 is assembled, by virtue of the presence of an annular gasket 240 of C cross-section. As will be apparent, besides outwardly sealing the joint between the two chamber 112 and 116, the gasket 240 also provides a seal between the side wall 222 of the boiler 212 and the baffle 217.

The baffle 217 also presents in this case a central through hole 224 (which is nothing other than the upper opening of the tube 226) into which a nozzle provided on the capsule 228 containing the ground coffee is forcibly inserted. As can be seen from FIG. 2, the capsule 228 is of inverted cone shape. Over the outlet of the nozzle 225 there is applied a liquid-permeable element 230 of the type (130) already described with reference to FIG. 1. The capsule 228 also presents perforations 232 in the vicinity of its upper end, performing the same purpose as those (132) of FIG. 1.

Again in this case the capsule 228 can conveniently be sold with the ground coffee already inserted into it, so making it of the disposable type. To enable the ground coffee to be inserted into the capsule 228, this can be formed as two plastic parts, one consisting for example of a conical side wall provided with the nozzle 225, the other consisting of the base wall of the cone, these parts then being joined together (by ultrasound or other conventional techniques) after inserting the desired quantity of ground coffee into the conical lower part.

With regard to the use of the coffee maker 210, when water has been fed into the boiler 212 the piece 214 comprising the baffle 217 (which closes the boiler 212) is positioned on it. The collection chamber 216 is then completely screwed down onto the boiler 212 (already containing the desired quantity of water), and the capsule 228

(already filled with ground coffee) is finally applied to the piece 214 by forcibly inserting the nozzle 225 of the capsule 228 into the hole 224 of the piece 214.

It should be noted that although in FIG. 2 the method used is that of forcibly inserting the nozzle 225 of the capsule 228 into the hole 224 of the piece 214, the connection between the baffle 217 and capsule 228 can also be achieved in other ways. In particular, for example, an upwardly projecting nozzle (not shown) forming one piece with the baffle 217 and the tube 212 can be provided on the upper face of the baffle 217, on which nozzle the nozzle 225 of the capsule 228 is externally mounted.

Figure 6:
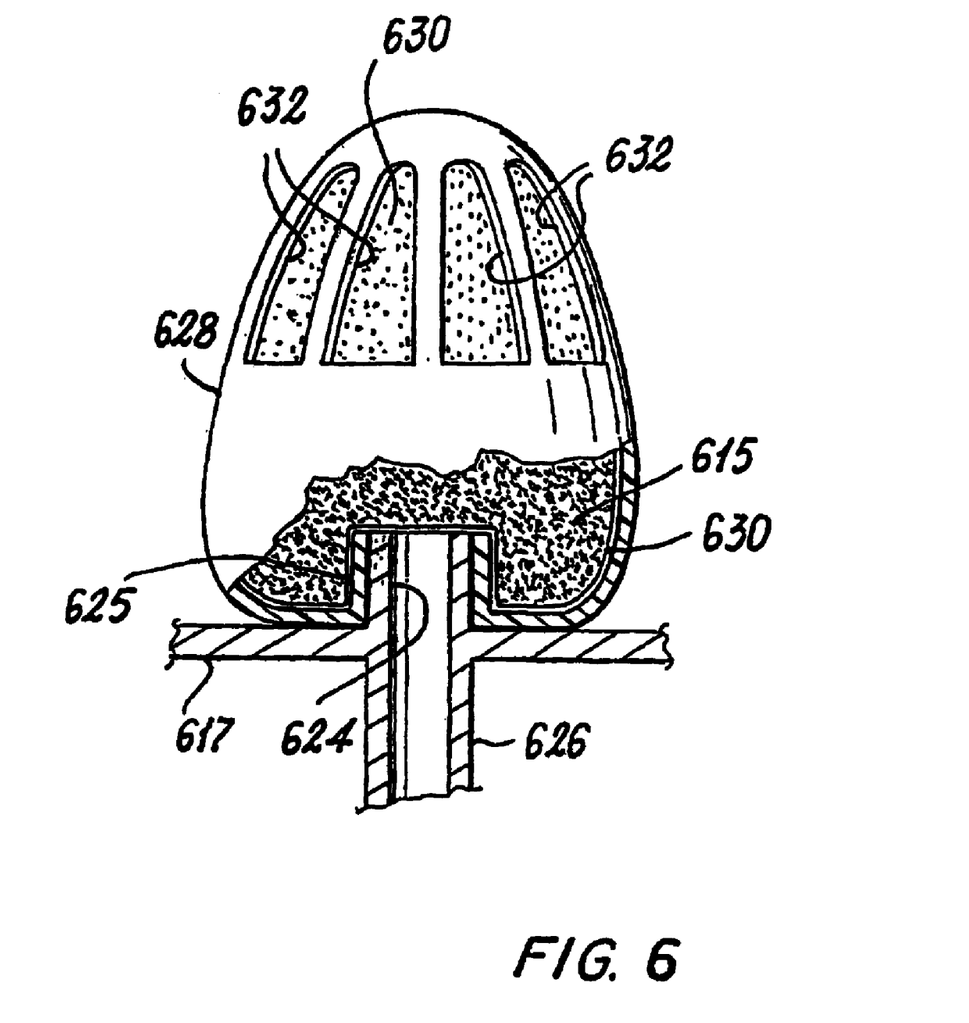
FIG. 6 is a partial view of a variant of the embodiment of FIG. 2.

Another way of connecting the capsule to the baffle is shown for example in FIG. 6, in which elements equal or of similar function to those of FIG. 1 are indicated by the same reference numerals plus 500. The capsule 628 presents a lower aperture 625 communicating with the tube 626 (again in this case, this latter being formed in one piece with the baffle 617), the aperture 625 being obtained by turning the lower wall of the capsule 628 inwards and upwards. As can be seen, the baffle 617 presents a nozzle 624 also facing upwards and forming one piece with the baffle 617. The connection between the capsule 628 and the baffle 617 is achieved by simply forcing the capsule 628 downwards such that the nozzle 624 of the baffle 617 (which in this specific case is nothing other than the upward extension of the tube 626) becomes inserted into the lower aperture 625 of the capsule 628, to achieve the situation of FIG. 6. From this figure it can also be seen that the walls of the capsule 628 upperly present ample apertures 632 for the escape of the beverage. To prevent the ground coffee 615 escaping from the apertures 632 or from the lower aperture 625 of the capsule 628, the ground coffee has been enclosed in a liquid-permeable enclosure 630 (in this case a flexible enclosure which adapts to the inner shape of the capsule 628) which is inserted into the capsule 628 (which is then sealed) before its sale (this hence being a disposable capsule).

Figure 3:
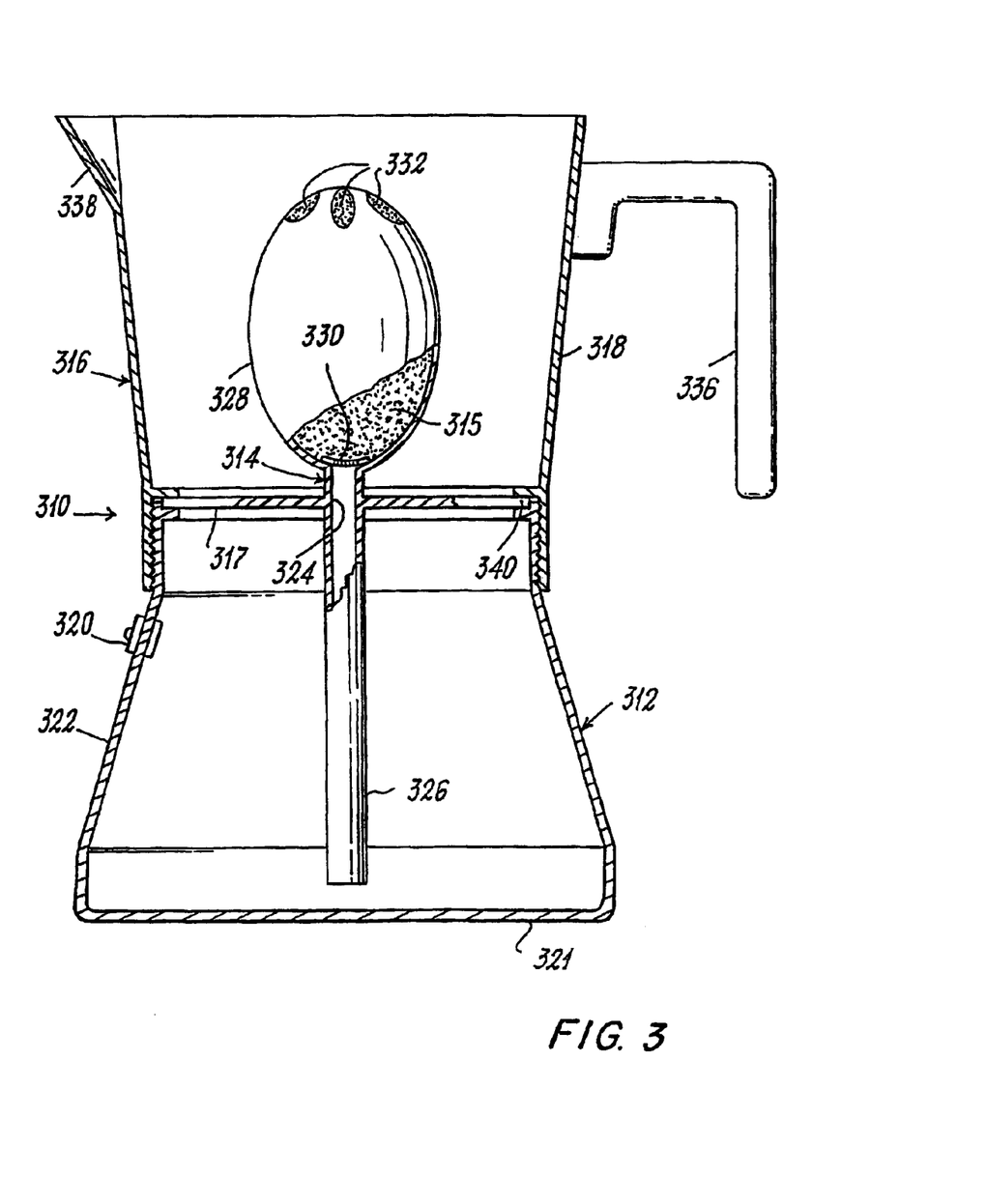
FIG. 3 is a third embodiment thereof.

The coffee maker of FIG. 3 (in which elements equal or of similar function to those of FIG. 1 are indicated by the same reference numerals plus 200), indicated by 310, differs from the two preceding in that the tube 326, the baffle 317 and the capsule 328 intended to contain the ground coffee 315 are formed as one piece 314 (to be used once only if the capsule 328 is not openable).

If a sufficiently soft plastic material is used to form the piece 314, the seal gasket at the periphery of the baffle 317 can be eliminated (as in FIG. 3), the peripheral part of this latter itself acting as the seal gasket. The piece 314 can also be formed of a suitable substantially rigid plastic, with the exception of the peripheral part of the baffle 317, which is formed of a softer plastic suitable for the seal. The entire said piece 314 can also be formed of substantially rigid plastic and a gasket similar to that (240) of C cross-section illustrated in FIG. 2 be applied to the peripheral edge of the baffle 317; or two gaskets can be applied performing the same function as the C-shaped gasket.

As can be seen from FIG. 3, the tube 326 proceeds for a certain distance above the wall 317 as far as the capsule 328. This latter is in the form of an ellipsoid disposed with its major axis vertical and, in addition to the usual liquid-permeable element 330, presents in this specific case four elliptical apertures 332 closed by a sheet of a liquid-permeable liquid (for example filter paper or fabric). Again in this case, the capsule 328 can be formed in two parts, the lower of which forms one piece with the tube 326 and the baffle 317, the upper part being applied by conventional techniques to the lower part once the ground coffee has been inserted into this latter.

It should also be noted that the embodiment of FIG. 3 can be varied by extending the tube 326 upwards such that it enters the interior of the capsule 328 for a determined distance, the upper opening of this tube being still closed by a liquid-permeable element. In this case, to prevent part of the produced beverage from remaining within the capsule 328, this latter can also be provided with apertures similar to the apertures 332 in its lower part, these being replaceable (as in the case of the apertures 332) by perforations; alternatively, the entire capsule 328 can be of a liquid-permeable material. In this latter case, as the formed beverage collects in the collection chamber 316 but also impregnates the ground coffee contained in the capsule 328, a beverage is obtained which is not only extracted but is also infused (the beverage must be left in the collection chamber 316 for a sufficient time). Such a beverage is generally preferred by non-Italians.

As is apparent from the aforegoing, in using the coffee maker 310, water is fed into the boiler 312, the piece 314 (the capsule 328 already containing the ground coffee 315) is positioned thereon, and the collection chamber 316 without the baffle 317 (already located in position) is screwed onto the boiler 312.

Figure 4:
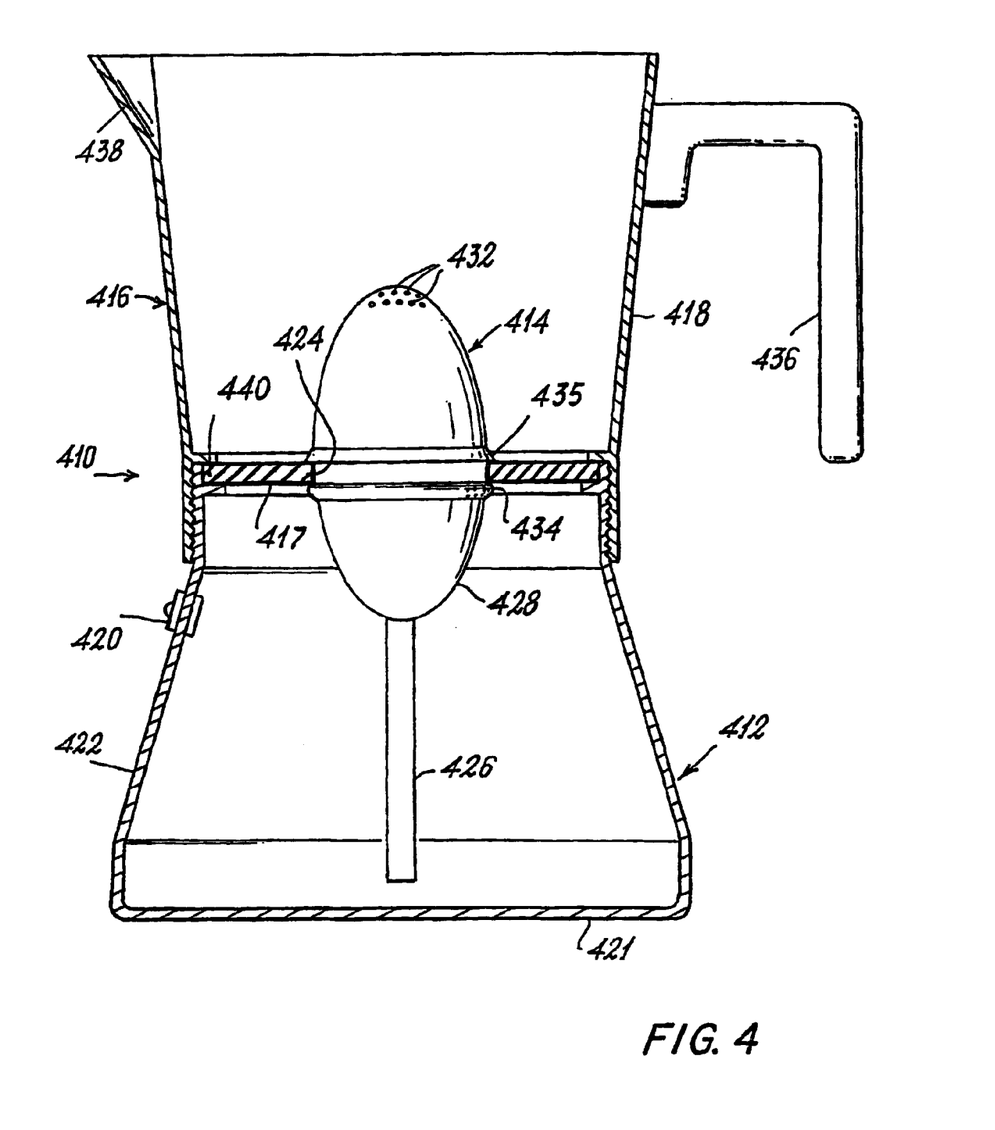
FIG. 4 is a fourth embodiment thereof.

In the coffee maker 410 of FIG. 4, elements equal or of similar function to those of the coffee maker 110 of FIG. 1 are indicated by the same reference numerals plus 300. The basic differences between this and the coffee maker 110 are the fact that the baffle 417 is removable and formed of a suitable plastic of a type which enables the peripheral edge of the baffle 417 to also act as the seal gasket. In addition the baffle 417 presents a very large through hole 424 such as to directly receive the capsule 428, this latter forming one piece 414 with the tube 426 (preferably of a suitable plastic material). To form the seal between the capsule 428 and the baffle 417, conventional seal means can be provided on the outer surface of the capsule 428 (for example an annular seal lip 434 to be forced beyond the baffle 417). It is also useful to provide an annular backing lip 435 (which could be replaced by a small number of counteracting projections).

Figure 5:
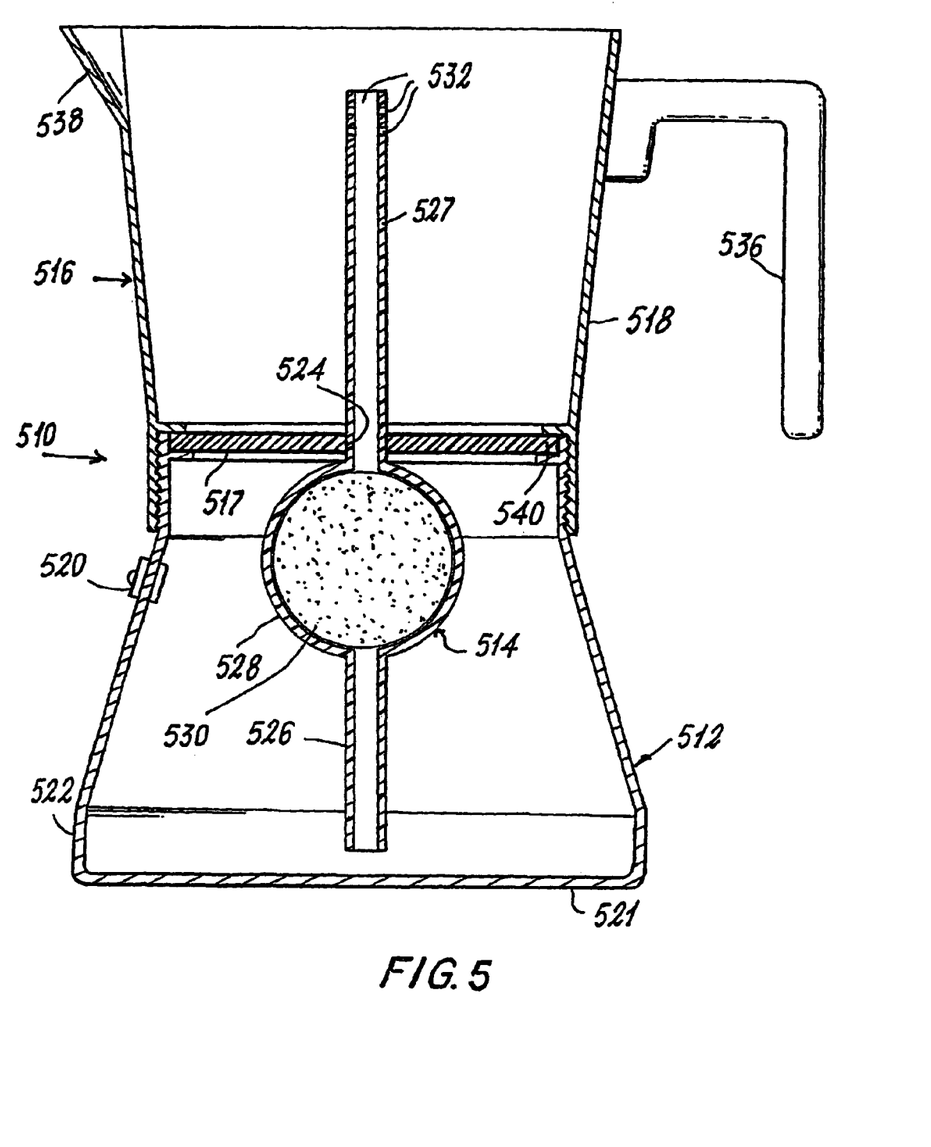
FIG. 5 is a fifth embodiment thereof.

A final embodiment 510 of the coffee maker of the invention is illustrated in FIG. 5, in which elements equal or of similar function to those of the coffee maker 110 are indicated by the same reference numerals plus 400. As can be seen from FIG. 5, in the coffee maker 510 the baffle 517 is of the removable type and, as in the preceding case, is formed of a suitable plastic enabling the peripheral edge of the baffle 517 to also act as the seal gasket. The feature of this embodiment is the fact that the capsule 528 is positioned below the baffle 517, the capsule 528 communicating with the collection chamber 516 via a supplementary vertical tube 527 which passes through the hole 524 provided in the baffle 517, its upper end presenting apertures 532. Conventional seal means (not shown in FIG. 5 for simplicity) are provided between the supplementary tube 527 and the baffle 517. As can be seen from the same figure, the capsule 528 contains a liquid permeable enclosure 530 in which the ground coffee is previously inserted.

As a variant to this latter embodiment, the baffle 517 can form one piece with the walls 518 of the collection chamber 516, this piece being formed preferably of a suitable metal. In this case an annular gasket forming an outward seal must be provided at the joint between the boiler 512 and the collection chamber 516.

The embodiments of the present invention illustrated in the drawings all present a collection chamber which is fixable to the boiler, in particular by screwing (even though, as already stated with reference to the coffee maker 210, other types of connection can be used). It is however important to note that the collection chamber can also be completely separate from the boiler, being located for example to the side thereof. In this case the boiler must be closed or closable by the baffle, the tube extending from the through hole of this latter and undergoing a bend so that the capsule fixed to its far end (in the manner of a bell) becomes located inside or above the collection chamber. It is apparent that in this latter case the collection chamber can be any container able to receive the beverage, for example a glass or cup.

As will be apparent, and in particular in the light of this latter example, numerous embodiments of the coffee maker of the invention are possible, all falling within the scope of protection thereof. In particular the shape of the capsule and the outer shape of the coffee maker can be endlessly varied.

Observing the embodiments illustrated in the figures, it will be apparent that the coffee maker of the present invention is simple to construct, and at significantly less cost than the known "espresso" coffee maker. Moreover, particularly if the capsule is of disposable type, the coffee maker is very simple and practical to use and to clean.

In the aforegoing description, ground coffee has always been mentioned. It should however be noted that (as also in the case of known coffee makers) instead of ground coffee, any other substance able to form a relative beverage by filtration and/or (if appropriate) infusion can be inserted into the capsule (128; 228; 328; 428; 528). By way of example such a substance can be roast or ground barley, ground tea, camomile, or even a freeze dried powder or soluble gelatin.

It should also be noted that instead of water or of water alone, other liquids or liquid mixtures can be fed into the first portion or boiler (221; 212; 312) provided they are suitable for forming relative beverages. For example such a liquid mixture could consist of water and grappa (already used in Friuli with the traditional espresso coffee machine, as is well known).

What is claimed is:

1. A coffee maker comprising:
   a chamber acting as a boiler to receive a determined quantity of water;
   a chamber for the final collection of the beverage produced;
   for containing the ground coffee; a filter device connecting together the two chambers and comprising a tube which dips into the water contained in the boiler; and
   a baffle provided to sealedly close the boiler, with the exception of a through hole for sealedly receiving the filter device,
   the filter device comprising an enclosure closed or closable to form a filter capsule, intended to contain the ground coffee and closed or closable independently of whether the coffee maker is assembled, the walls of the capsule being liquid permeable in a region which communicates with the tube and in at least one region which communicates with the collection chamber,
   wherein the capsule is disposed in the collection chamber, and
   wherein the through hole provided in the baffle receives the dip tube.

2. A coffee maker (110; 210; 310) as claimed on claim 1, with its capsule (128; 228; 328) disposed in the collection chamber (116; 216; 316), wherein the through hole (124; 224; 324) provided in the baffle (117; 217; 317) receives the dip tube (126; 226; 326).

3. A coffee maker (210; 310; 410; 510) as claimed in claim 1, wherein the baffle (217; 317; 417; 517) is removable, seal means (240; 340; 440; 540) being provided to provide a seal at the periphery of the baffle (217; 317; 417; 517) when the coffee maker (110; 210; 310) is assembled.

4. A coffee maker (110; 210; 310) as claimed on claim 1, wherein the filter capsule (128; 228; 328; 428; 528) already contains the ground coffee (115; 215; 315) and is not openable or closable by the user, it hence being of disposable type.

5. A coffee maker as claimed in claim 1, wherein the filter capsule can be opened by the user to enable ground coffee to be inserted into it.

6. A coffee maker (110; 410) as claimed in claim 1, wherein the filter capsule (128; 428) forms one piece with the dip tube (126; 426).

7. A coffee maker (310) as claimed in claim 3, wherein the filter capsule (328) forms one piece with the dip tube (326) and with the baffle (317).

8. A coffee maker (210) as claimed in claim 3, wherein the baffle (217) and the dip tube (226) form one piece.

9. A coffee maker (110) as claimed in claim 1, wherein the baffle (117) forms one piece with the collection chamber (116).

10. A coffee maker as claimed in claim 1, wherein the baffle forms one piece with the boiler.

11. A coffee maker as claimed in claim 1, wherein at least a peripheral edge of the baffle is made of a suitable plastic material to act as a seal gasket.

12. A coffee maker (110; 210; 410) as claimed in claim 1, wherein the liquid permeability of the first region and/or of the at least one second region of the walls of the filter capsule (128; 228; 428) is achieved by providing, in these regions, perforations (132; 232; 432) of a size such as not to allow the ground coffee (115; 215) to escape.

13. A coffee maker (110; 210; 310; 510) as claimed in claim 1, wherein the liquid permeability of the first region and/or of the at least one second region of the walls of the filter capsule (128; 228; 328; 528) is achieved by providing apertures, and disposing on these apertures a means (130; 230; 330, 332; 530) which is permeable to liquids but which prevents escape of the ground coffee (115; 215; 315) from these apertures.

14. The coffee maker as claimed in claim 1, wherein at least one of the liquid-permeable element the area opposite to where said tube extends comprises a plurality of apertures having disposed thereon an element permeable to liquids but which prevents escape of ground coffee from said plural apertures.

15. A filter device (126, 128; 226, 228; 326, 328; 426, 428; 526, 528, 527; 626, 628) containing or intended to contain ground coffee (115; 215; 315; 415; 615), this device forming part or intended to form part of a coffee maker (110; 210; 310; 410; 510) in accordance with claim 1, comprising a tube (126; 226; 326; 426; 526; 626) which, with the coffee maker assembled, dips into the water contained in the boiler (112; 212; 312; 412; 512), characterised by comprising an enclosure closed or closable to form a filter capsule (128; 228; 328; 428; 528; 628) containing or intended to contain the ground coffee and closed or closable independently of whether the coffee maker is assembled, the walls of the capsule being liquid-permeable in a region (130; 230; 330) which communicates with the tube and in at least one other region (132; 232; 332; 432; 532) which communicates with the collection chamber.

16. A coffee maker, comprising: a boiler chamber; a collection chamber releasably connected to said boiler chamber; a filter device connecting the boiler chamber to the collection chamber; a tube having a first end extending from an exterior surface of said filter device and a second end extending into said boiler chamber; a baffle sealedly closing the boiler chamber except for a through hole that sealedly receives one of the filter device and the tube; and a liquid-permeable element on an interior surface of said filter device covering said first end of said tube, said filter device being liquid-impermeable except through said liquid-permeable element and in an area opposite to where said tube extends; wherein the through hole receives the filter device.

17. A coffee maker, comprising: a boiler chamber; a collection chamber releasably connected to said boiler chamber; a filter device connecting the boiler chamber to the collection chamber; a tube having a first end extending from an exterior surface of said filter device and a second end extending into said boiler chamber; a baffle sealedly closing the boiler chamber except for a through hole that sealedly receives one of the filter device and the tube; and a liquid-permeable element on an interior surface of said filter device covering said first end of said tube, said filter device being liquid-impermeable except through said liquid-permeable element and in an area opposite to where said tube extends wherein the removable from both the boiler chamber and the collection chamber.

* * * * *

UNITED STATES PATENT AND TRADEMARK OFFICE
CERTIFICATE OF CORRECTION

PATENT NO. : 6,912,949 B2
APPLICATION NO. : 10/398246
DATED : July 5, 2005
INVENTOR(S) : Adriana Brizio It is certified that error appears in the above-identified patent and that said Letters Patent is hereby corrected as shown below:

Column 12: Claim 17, line 12, change "wherein the removable from both" to --wherein the baffle is removable from both--.

Signed and Sealed this

First Day of January, 2008

JON W. DUDAS
*Director of the United States Patent and Trademark Office*